Aug. 21, 1956  W. F. SIMPSON ET AL  2,759,316
COTTON STRIPPING UNIT
Filed Dec. 10, 1954  2 Sheets-Sheet 1

INVENTOR.
WILLIAM F. SIMPSON
BY KERMIT A. LLOYD

ATTORNEYS

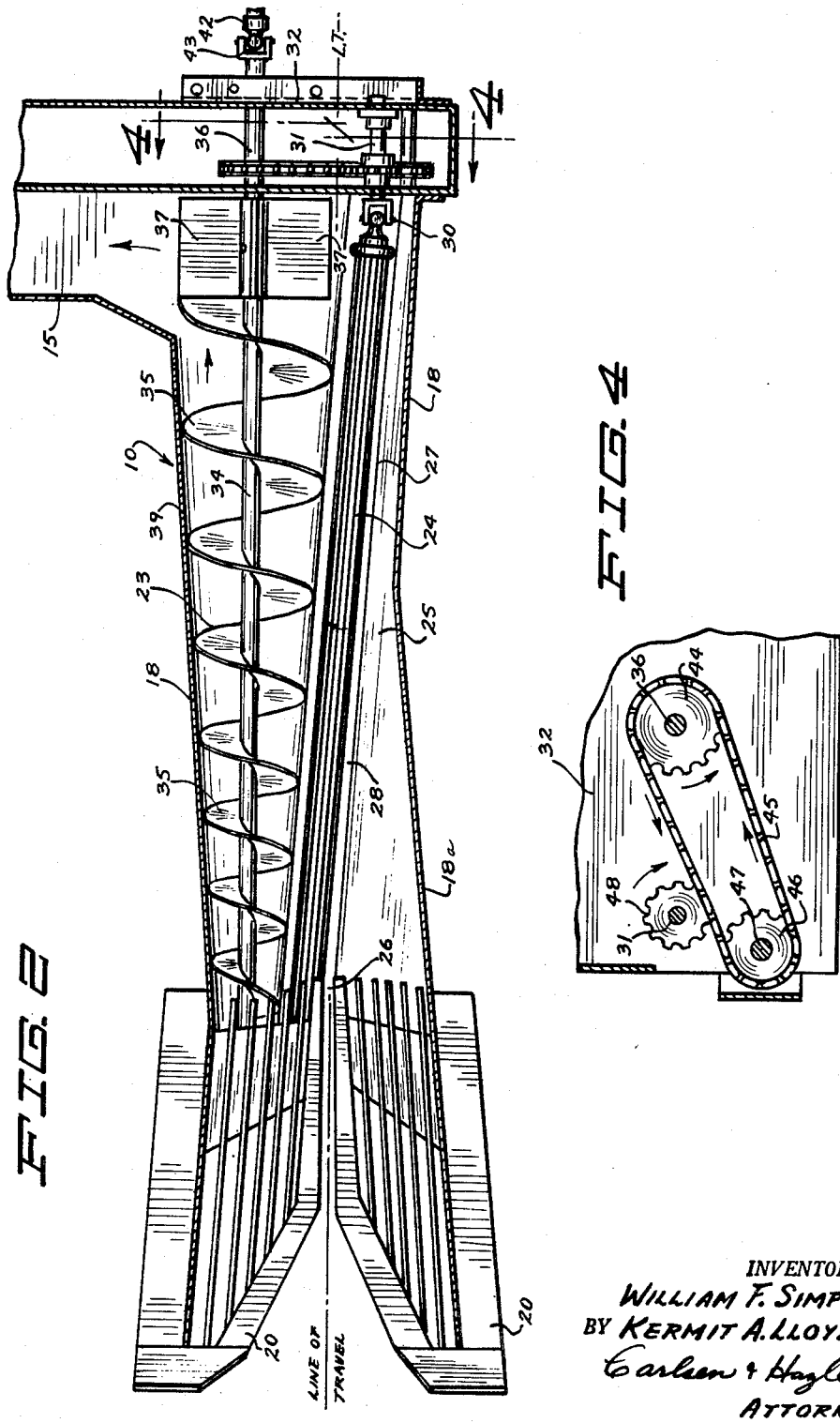

2,759,316

COTTON STRIPPING UNIT

William F. Simpson and Kermit A. Lloyd, Louisville, Ky., assignors to Minneapolis-Moline Company, Hopkins, Minn., a corporation of Minnesota Application December 10, 1954, Serial No. 474,397

3 Claims. (Cl. 56—14)

This invention relates generally to cotton harvesting machinery and more particularly to the mechanism for stripping the bolls from the cotton plants and moving them to a central area for rearward conveyance to a transport wagon.

Tractor mounted cotton strippers are generally constructed with two stripping units arranged in transversely spaced relation one on each side of the tractor engine and adapted to simultaneously strip the cotton from two adjacent rows in the field. These stripping units are each conventionally provided with an elongated stripper roll which rotates on its longitudinal axis beside a stripper bar to remove the bolls from the cotton plants as they pass therebetween. There is also provided suitable conveyor mechanism, such as an auger, to convey the stripped cotton rearwardly in the unit to a place from which it is moved laterally inward by other mechanism to be united with the cotton from the other unit. It is with improving the construction and operation of these stripping units to perform their intended functions that this invention is primarily concerned.

In heretofore known cotton stripping units the stripper roll has been disposed with its longitudinal axis in parallelism with the plant row as it performs the stripping operation. With the roll so positioned there is a marked tendency for the plants to bunch up in the rear of the unit with resultant impairment of its stripping effectiveness.

With this in mind the primary object of our invention is to provide a stripping unit having a stripper roll arranged to keep the plant stalks strung out in a line between the roll and stripper bar as the plants are acted upon for boll removal and prohibit their collection in bunches at the rear end of the unit.

Another object of the invention is to provide a cotton stripping unit having a stripper roll disposed at an angle to the plant row so as to remove the plant bolls with a shearing action.

Another object of the invention is to provide a cotton stripping unit with a conveyor for moving the stripped cotton rearwardly and which is so constructed and arranged relative to the stripper roll as to eliminate the necessity of a cross conveyor to carry the crop inwardly for reception and rearward removal by the wagon elevator.

Still another object of the invention is to provide an improved construction for a cotton stripping unit having a longitudinal conveyor wherein the conveyor is designed to handle an increasingly greater crop load along its length from front to rear.

Still another object of the present invention is to provide a cotton stripper having a pair of stripping units for simultaneously stripping adjacent rows of cotton in the field and delivering the cotton rearwardly and laterally to a common centrally located wagon elevator, said rearward and lateral movement in each unit being accomplished by a single conveyor member.

With these and other objects in view our invention broadly comprises mounting of the stripper roll and cooperating stripper bar in the cotton stripping unit at a slight cross angle to the longitudinal line of travel of the unit whereby the plant-receiving passageway between the roll and bar is at an angle to the plant row to cause the plants to move through the passageway in evenly spaced relation throughout the boll removal operation. The removed cotton bolls are carried rearwardly in the unit by a screw conveyor having a spiral vane therealong of gradually increasing diameter from front to rear and said conveyor having a blade or paddle portion adjacent its rear end for laterally diverting the cotton from its path of movement along the spiral vane.

The above mentioned and still additional objects of the invention will be brought to light during the course of the following specification, reference being made to the accompanying drawings, in which—

Fig. 2 is a section through the unit taken on line 2—2 of Fig. 1 and showing in plan the horizontal arrangement of the components of the stripping mechanism.

Fig. 4 is a transverse vertical section taken on line 4—4 of Fig. 2 showing a portion of the drive mechanism for the auger conveyor and stripper roll.

Figure 1:
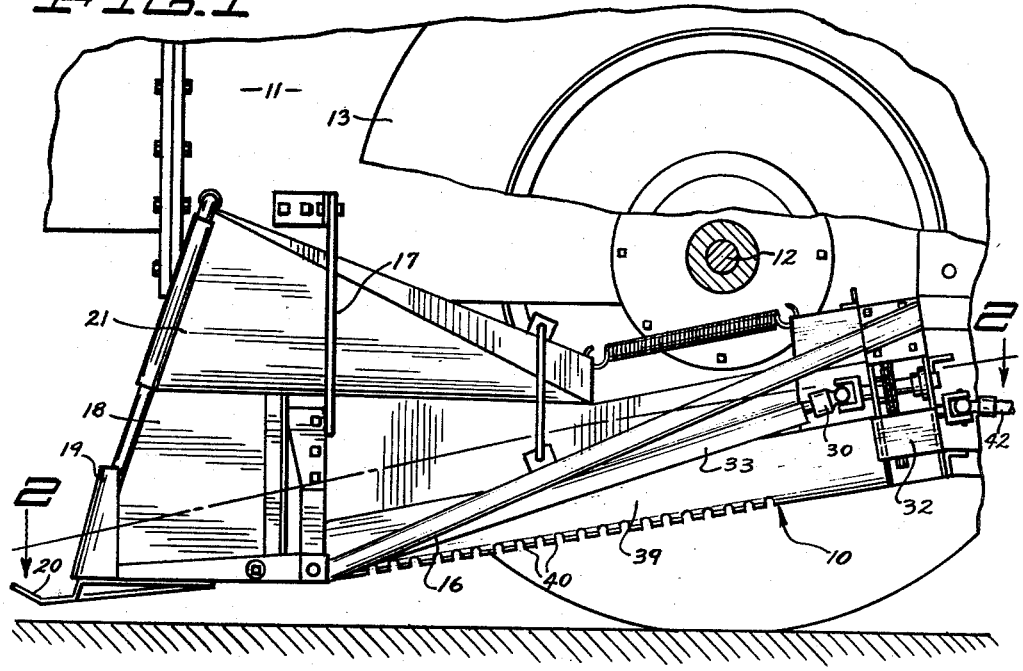
Fig. 1 is a side elevation of the improved stripping unit mounted on the left side of a tractor, with the left rear wheel of the tractor partially broken away for a better understanding of the invention.

Referring now more particularly to the drawings reference numerals will be used to denote like parts and structural features in the different views. Referring first to Figs. 1 and 2, the stripping unit is indicated generally by the number 10 and is shown mounted on a tractor 11 having a rear axle 12 at the ends of which are mounted rear wheels 13. The unit 10 extends longitudinally under and forwardly of the axle in the space between the tractor chassis and the wheel 13. A unit 10 is normally mounted at each side of the tractor for the simultaneous harvesting of two rows of cotton. However, inasmuch as the units at each side are oppositely identical in construction, only the unit at the left side is herein shown and described. The units 10 at each side have open connection with a single centrally disposed crop receiving chamber 15 which in turn communicates with a wagon elevator mechanism (not shown) which carries cotton from the chamber 15 upwardly and rearwardly for deposit in the box of a wagon hitched in trailing relation to the tractor.

The unit 10 has a carrying frame which need not be described in detail but which includes a forwardly extending beam 16 having its rear end connected to the tractor chassis and bracket means 17 for suspending the front end of the beam from the tractor. The unit proper has a housing mounted on the frame which includes transversely spaced inner and outer side walls designated respectively at 18 and 18a, and which carry opposing crop guides 19 and vine lifters 20 at their forward ends in conventional manner. The unit may be provided with a spring tensioned collapsible hood 21. However, such hood is not a necessary part of the present invention.

The novelty in the present disclosure resides in the construction and arrangement of the various components of the stripping and conveying mechanism in the unit. This mechanism, as best shown in Fig. 2, comprises an auger 23, a stripper roll 24 and a stripper bar 25, all extending generally longitudinally of the unit in side by side relation. The unit may also be provided with a rotary stripper beater over the auger, but inasmuch as this forms no part of the present invention it is not shown.

The unit 10 itself is so mounted on the tractor as to be in longitudinal alignment with the direction of travel of the tractor so that the cotton plants will be received in the narrow throat 26 provided between the vine lifters 20. The direction or line of travel of the unit is indicated by the broken line LT in Fig. 2.

The stripper roll 24 and the inner face 27 of the stripper bar 25 are longitudinally parallel to each other but spaced apart transversely to provide an elongated plant receiving passageway 28 therebetween. Face 27 and the axis of roll 24 are disposed at a slight angle to the line of travel, both angling laterally outward in their rearward extension, whereby the passageway 28 which meets endwise with the throat 26 is also at an angle.

Roll 24, of constant diameter throughout its length, has its forward end journaled in a bearing suitably mounted on the unit frame and is universally connected as at 30 at its rear end with a shaft 31, which is journaled for rotation in the front and rear walls of a gear housing 32 at the rear end of the unit. Stripper bar 25 is mounted on the outer wall 18a and extends the length of the roll 24. It will be understood that the roll and bar lie one on each side of the throat 26 so that the plant passageway through the vine lifters and stripping mechanism is continuous. A shield 33 (Fig. 1) may be provided to protect the roll 24 from below.

The auger 23 comprises a center shaft 34 which integrally carries a spiral vane 35. Shaft 34 has its forward end suitably journaled in a bearing (not shown) mounted on the unit and extends rearwardly in on a vertical plane substantially parallel to the line LT. The auger is longitudinally tapered with the vane 35 gradually increasing in diameter as it winds rearwardly around the shaft 34. The vane terminates at the opening between the unit housing and the chamber 15 while shaft 34 extends rearwardly on through the gear housing as at 36. Immediately opposite the opening into chamber 15 the auger shaft carries a plurality of radially extending beaters or paddles 37.

An auger trough 39 is preferably attached at one side to the inner housing wall 18, and at the other side to the roll shield 33, and encircles substantially the lower half of the auger. This trough extends forwardly from the gear housing 32 along the entire length of the auger and is tapered in its forward extension to conform closely to the peripheral edges of the auger vane 35. The trough may be provided with transverse bottom slots 40 to allow the escape of dirt and the like therefrom.

The auger and stripper roll are driven from a drive shaft 42 having suitable connection with the tractor power take-off or other power source. The extension 36 of the auger shaft 34 extends rearwardly beyond the housing 32 for connection as at 43 with the rotary drive shaft 42. Within the housing 32 the auger shaft extension 36 carries a sprocket 44 which is connected by chain 45 with an idler sprocket 46 mounted for rotation within the housing on stub shaft 47. Shaft 31 carries a sprocket 48 which meshes with the chain 45 to be driven thereby in a reverse direction relative to the rotation of the auger.

Figure 3:
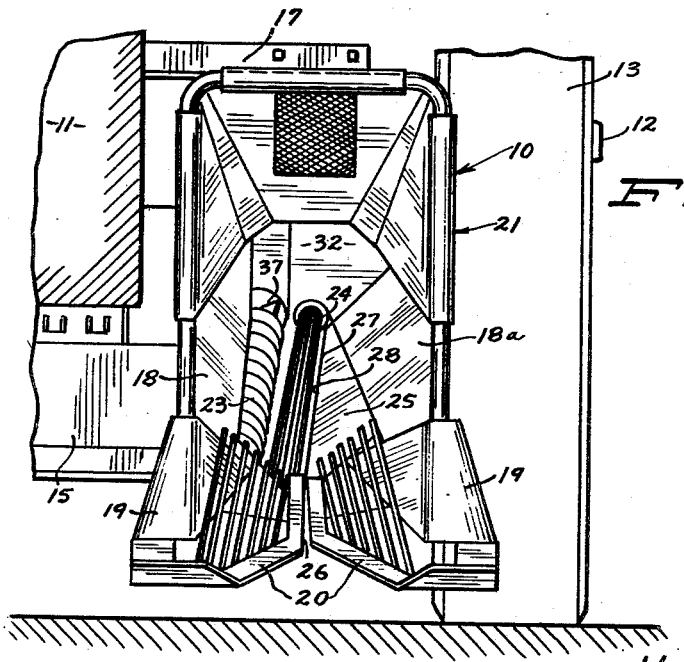
Fig. 3 is a front elevation of the unit.

It will, of course, be understood by observance of Figs. 1 and 3 that the auger 23, roll 24 and bar 25 are all disposed in an upwardly and rearwardly inclined position when the unit 10 is mounted in operating position. Also the stripper bar and roll are of conventional construction with the roll having a corrugated peripheral surface, the corrugations adapted to tear the cotton bolls from a plant which is held to a confined path of movement between the roll and bar.

As the unit 10 is moved along a row of plants the plants will be guided by the members 19 and 20 through the throat 26 and into the passageway 28 where they are subjected to the stripping action of the roll 24. The plants will in effect be pulled downwardly between the roll and bar as they pass rearwardly through the passageway 28 to pull the bolls into contact with the roll.

As the cotton bolls are removed from the plants they are tossed inwardly into the auger trough 39, the bottom of which is considerably lower than the axis of roll 24.

The harvested cotton is then subjected to the rearward conveying action of the rotating auger 23 until it reaches the rear paddle section of the auger. Paddles 37 moving inwardly under the auger shaft then feed the bolls laterally into the central chamber 15 which receives the cotton from units 10 at both sides of the tractor.

While the positions of the stripper roll 24 and stripper plate 25 relative to each other are conventional, their angular disposition relative to the line of travel of the unit is novel to the art. This feature increases the stripping efficiency of the unit due to the fact that the plants are necessarily bent over as they pass along the roll to sever the bolls with a shearing action rather than a slugging action. Also the angularity of the roll keeps the plants strung out therealong and prohibits bunching of the plants at the rear of the unit. The feature desirably allows a greater spread between any point along the roll and plant root without increasing the degree of vertical incline of the roll.

The conveyor disclosed eliminates the necessity of a transverse conveyor at the rear of the unit for carrying the stripped cotton laterally into the chamber 15. The auger member 23 as designed does in fact move the cotton both rearwardly and sidewardly with its unitary rotary motion, as the auger vane conveys the crop rearwardly in the trough 39 into the area where it is acted upon by the underfeed paddle or beater member 37.

Inasmuch as the bolls are stripped from the plants throughout the period of plant passage along the stripper roll, it will be obvious that the conveyor trough 39 will be obliged to carry increasingly greater amounts of the crop at successive rearward points therealong. It is accordingly desirable that the trough and its cooperating auger be greater in cross dimension at their rear portions than at their forward portions. The tapered auger and trough accomplish this objective. What is more, the taper may mate with the lateral angle of the stripper roll, as shown in Fig. 3, so that both features may be used without materially increasing the width of the unit.

As heretofore stated the stripping units are used in pairs, one at each side of the tractor. The unit shown is designed for use at the left side. The right side unit would be identical to unit 10 with the parts laterally reversed in construction and arrangement so that such right side unit would also deliver cotton to the chamber 15.

There is accordingly herein disclosed an improved cotton stripping unit which economically and effectively carries out the aforementioned objectives. It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a cotton stripping unit adapted to be mounted on a tractor and moved in a longitudinal line of travel along a straight row of cotton plants, a stripping mechanism including a stripper roll and stripper bar laterally spaced on the unit to provide a plant passageway therebetween, the stripper roll adapted to be rotated to strip bolls from cotton plants passing through said passageway, a trough on the unit extending along and beside said stripping mechanism for receiving the stripped bolls, a rotary screw conveyor extending longitudinally of the line of travel and within said trough for moving the bolls rearwardly therein, said conveyor having a spiral vane which gradually increases in external diameter from the front to the rear end portion of the conveyor, said stripper roll and bar disposed at a lateral angle to the line of travel and generally parallel to the common vertical plane of the adjacent exterior edges of the vane.

2. In a cotton harvester, a stripping unit having mechanism for removing cotton bolls from cotton plants as the unit is moved in a line of travel along a row of such plants, said unit including a forwardly tapering upwardly opening trough extending parallel to the line of travel, a longitudinally extending auger having its lower portion disposed within said trough, said auger having a spiral vane which is tapered in external diameter from rear to front of the auger to conform to the interior of the trough, means on the harvester for driving the auger to convey the removed bolls rearwardly along the trough, and said mechanism including a stripper roll and stripper bar extending longitudinally in spaced parallelism beside the auger, said roll and bar extending parallel to the vertical plane of taper of the auger vane to lie at a lateral angle to the line of travel.

3. In a cotton harvesting device adapted to be mounted on a draft tractor and moved in a line of travel along a row of cotton plants to harvest the cotton bolls therefrom, a supporting frame for attachment to the tractor, a forwardly opening housing mounted on the frame and having a pair of transversely spaced side walls, a stripper bar attached to one side wall and extending inwardly therefrom, the inner edge of the stripper bar lying at an angle to said line of travel, a stripping roll journaled for rotation in the housing and spaced inwardly from and parallel to the inner edge of the bar providing a plant receiving passageway therebetween, said housing including a conveyor trough disposed beside the roll having its longitudinal axis parallel to the line of travel, said trough tapering in its forward extension for parallelism between the roll and the adjacent edge of the trough, and a rotary auger disposed within the trough having its spiral vane tapering in diameter in its forward extension to conform to the shape of the trough.

References Cited in the file of this patent

UNITED STATES PATENTS

| | | |
|---|---|---|
| 1,716,769 | Friend | June 11, 1929 |
| 2,371,822 | Hyman | Mar. 20, 1945 |
| 2,406,058 | Boone | Aug. 20, 1946 |
| 2,532,065 | Hyman | Nov. 28, 1950 |
| 2,677,226 | Hyman | May 4, 1954 |